United States Patent

[11] 3,575,614

[72] Inventors Robert W. Polkinghorn
Huntington Beach;
Arthur F. Pfeifer, Whittier, Calif.
[21] Appl. No. 783,603
[22] Filed Dec. 13, 1968
[45] Patented Apr. 20, 1971
[73] Assignee North American Rockwell Corporation

[54] LOW VOLTAGE LEVEL MOS INTERFACE CIRCUIT
9 Claims, 4 Drawing Figs.

[52] U.S. Cl. .......... 307/251, 307/304, 330/35
[51] Int. Cl. .......... H03k 17/60
[50] Field of Search .......... 307/205, 251, 279, 304; 330/35, 38 (FE)

[56] References Cited

UNITED STATES PATENTS

| | | | |
|---|---|---|---|
| 3,268,827 | 8/1966 | Carlson et al. | 307/251X |
| 3,449,686 | 6/1969 | Bladen | 330/35X |
| 3,443,122 | 5/1969 | Bowers, Jr. | 307/205 |

*Primary Examiner*—Stanley T. Krawczewicz
*Attorneys*—William R. Lane, L. Lee Humphries and Robert G. Rogers

ABSTRACT: An input MOS device has its gate electrode connected to a network for biasing the gate slightly in excess of the threshold voltage for the device. The excess bias is not greater than the maximum anticipated interface signal level which appears on the input electrode of the device. A transistor is connected to the other electrode of the device for amplifying current from the device. A second MOS device is connected in series with the transistor and a voltage source.

When the input voltage is equal to or less than the excess bias voltage, the input device turns on for driving the transistor and for connecting the output electrode of the second device to ground through the transistor. When the input voltage is more than the excess bias voltage, the input device is turned off and the output electrode is driven to a usable MOS signal level.

INVENTORS
ARTHUR F. PFEIFER
ROBERT W. POLKINGHORN
BY Robert G Rogers
ATTORNEY

INVENTORS
ARTHUR F. PFEIFER
ROBERT W. POLKINGHORN
BY
Robert G Rogers
ATTORNEY

LOW VOLTAGE LEVEL MOS INTERFACE CIRCUIT

BACKGROUND OF THE INVENTION

1. Field of the Invention

This invention relates to a circuit such as a MOS circuit which is biased for interfacing relatively low-voltage signals with other circuits such as MOS circuits.

2. Description of Prior Art

Arrays of MOS devices connected as circuits, for example, in a MOS computer, ordinarily require high-voltage amplitude signals (10—15 volts) for interfacing with each other. The arrays require energy proportional to the square of the voltage signals and considerable noise is introduced into the system by use of high voltage signals.

A preferred interfacing system would be one in which low-voltage level signals could be used to interface the MOS arrays. The present invention provides such a capability.

SUMMARY OF THE INVENTION

Briefly, the invention comprises an input MOS device which has its gate, or control, electrode biased at a voltage slightly in excess of one threshold. As a result, the input device can be turned on by relatively low-voltage levels which are less than the excessive bias. Stated alternately, the excess voltage must not have an absolute potential which is greater than the maximum (absolute) swing of a low level input signal. If the input signal alternates from approximately ground to a negative level, the excess voltage must be no more negative than the maximum negative level of the input signal. If the signal alternates between approximately ground and a positive level, the excess voltage must be no more positive than the maximum positive level of the input signal.

The input device is connected in series with an output MOS device operated as a resistor and having an output electrode connected to the input device. When the input device is on, substantially all the voltage from a voltage source is dropped across the output MOS device so that the output terminal is driven approximately to ground. When the input device is off, a usable output voltage level is produced at the output terminal.

In a preferred embodiment, a transistor is connected between the MOS devices for amplifying the current through the input device so that the input device can be made physically small. In other words, by using a transistor, the devices can be made to exhibit different electrical properties even though the devices have the same geometry. Without the use of the transistor, one device must be large relative to the other.

A voltage divider network uses a transistor to amplify the current through a MOS resistor for holding the bias voltage at a constant level slightly in excess of one threshold.

Therefore, it is an object of this invention to provide a switching circuit through which low-voltage signal levels can be interfaced with other switching circuits.

Still a further object of the invention is to provide a MOS interfacing circuit in which MOS devices are connected in a bias circuit for providing a relatively high output signal as a function of a relatively low level input signal and a bias voltage.

A still further object of the invention is to provide MOS devices connected in series as resistors including a transistor connected between the devices for decreasing the effective resistance of one device relative to the other.

Another object of the invention is to provide a MOS resistor bias network for biasing a MOS input device for turning on at input voltages less than the threshold voltage of the device.

These and other objects of the invention will become more apparent in connection with the following drawings.

DESCRIPTION OF THE PREFERRED EMBODIMENTS

Figures 1, 2, 3:
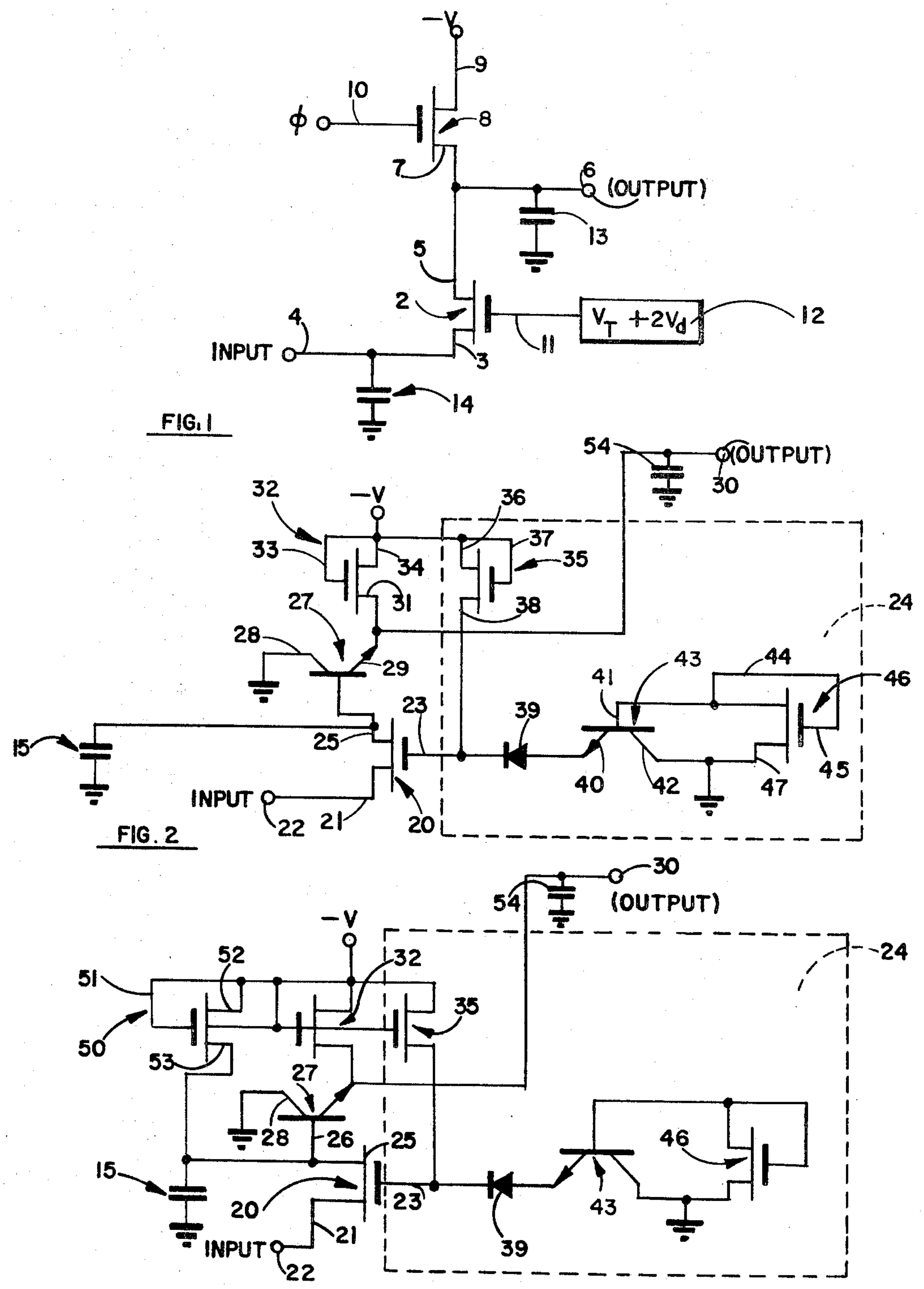
FIG. 1 illustrates one embodiment of a MOS circuit responsive to relatively low-voltage signals for interfacing circuits using MOS devices.
FIG. 2 represents a preferred embodiment of a low-voltage level MOS circuit having a biasing network comprised of MOS resistors.
FIG. 3 represents an improvement in the FIG. 2 embodiment including a second MOS device connected between a voltage source and an input MOS device for improving the output switching time.

FIG. 1 shows MOS interfacing circuit 1 which comprises input MOS device 2 having its source electrode 3 connected to input terminal 4 and its drain electrode 5 connected to output terminal 6. The drain electrode 5 is also connected to drain electrode 7 of MOS device 8.

The MOS device 8 has its source electrode 9 connected to voltage source, $-V$, and its gate electrode 10 connected to a signal source represented by $\Phi$ for turning the device on at required intervals.

Gate electrode 11 of MOS device 2 is connected to biasing source 12 for biasing the gate electrode 11 voltage slightly in excess of the threshold voltage ($V_t$) of device 2. The biasing source 12 may provide a bias voltage of, for example, $V_t+2V_d$. $V_d$ may be provided by diode junction drops for making the bias voltage at gate 11 exceed the threshold voltage so that when the input interfacing signal is less than the $2V_d$ voltage, the device 2 turns on.

In the FIG. 1 embodiment, device 2 is assumed to have a physical size substantially larger than the physical size of device 8 so that the resistance of device 2 is substantially lower than the resistance of device 8. In one embodiment, the resistance may have a ratio of 160 to 1. The significance of the resistance ratios is shown in the following paragraph.

When the input voltage is less than the excess bias voltage at the gate electrode of device 2, the device is turned on and the output terminal 6 is driven approximately to ground. It is assumed that the signal $\Phi$, is on so that device 8 is also turned on. Since the resistance of the device 2 is substantially smaller than the resistance of device 8, substantially all the voltage is dropped across device 8 so that the output is connected to approximately ground.

When the input voltage is greater than the excess bias voltage at the gate electrode 11, device 2 is turned off and the output 6 is driven to the source voltage $-V$,if the signal from source $\Phi$ is greater by a threshold than $-V$. Otherwise, the output voltage would be reduced by the amount of the threshold voltage for MOS device 8.

The FIG. 1 circuit can be operated in a different mode than that described above, for eliminating the necessity to ratio the resistance of the MOS devices. For example, when device 8 is on its own, capacitor 13 is charged to approximately $-V$. Capacitor 14 shown connected to the input terminal, is similarly charged to a voltage for turning MOS device 2 off. The capacitor may be charged to approximately −3 volts. After both capacitors are charged, $\Phi$ is turned off and the input terminal is conditionally discharged to ground. As a result, MOS device 2 is turned on and capacitor 3 is discharged to ground. If the capacitor 14 is not connected to the ground, the voltage on the capacitors remains unchanged. Therefore, regardless of the ratio of the resistances of the MOS devices, the output voltage will have a voltage level approximately equal to $-V$ or will have a voltage level approximately equal to ground as a function of the charge on capacitor 14.

Therefore, for low-level signals, approximately ground or less than $2V_d$, device 2 turns on and sets the output to ground. When the signal is larger than $2V_d$, for example −3 volts, the output is set at approximately $-V$ so that the circuit can easily be used as an interface circuit for relatively low-voltage input signals.

The bias voltage can be derived from any suitable source such as a power supply although a preferred embodiment of a biased network is shown in FIG. 2. As a practical matter, power supplies are not desired because the threshold voltages for MOS devices varies from substrate to substrate. Therefore, adjustments in the power supply voltages for each substrate or a plurality of power supplies would be required. By using a network as shown in FIG. 2, where the devices comprising the bias network are produced in the same substrate, or chip, as the devices comprising the balance of the circuit, no adjustments are required. The network can be used to bias all interfacing circuits of a chip.

It is pointed out that the MOS devices described and shown in the FIGS. are P-channel devices although the invention is not limited to such devices. N-channel devices are also within the scope of the invention. It is well known to persons skilled in that art that one type of device can be used in lieu of the other type by changing the voltage polarities involved.

FIG. 2 shows a preferred embodiment of the invention in which the MOS devices in the circuit are produced in a chip with approximately the same physical properties.

Input MOS device 20 comprises source electrode 21 connected to input terminal 22, gate electrode 23 connected to bias network 24 and output electrode 25 connected to base electrode 26 of NPN transistor 27 connected as an emitter follower. Collector electrode 28 of the transistor 27 is connected to ground and its emitter electrode 29 is connected to output terminal 30 and to output electrode 31 of MOS device 32. The gate electrode 33 and the input electrode 34 of MOS device 32 are connected to voltage source, $-V$, Capacitor 54 is connected between output terminal 30 and ground to store the voltage potential which appears on the output electrode. Capacitor 15 is connected between output electrode 25 of MOS device 20. The capacitor represents the inherent capacitance associated with the output electrode of MOS device 20.

The bias network 24 comprises MOS device 35 having its input electrode 36 and its gate electrode 37 connected to voltage source, $-V$, and its output electrode 38 connected to gate electrode 23 of device 20 and to the cathode side of diode 39 of the network. The anode side of diode 39 is connected to emitter 40 of transistor 41 which is connected as an emitter follower. Collector 42 of transistor 41 is connected to ground. Input electrode 44 and gate electrode 45 of MOS device 46 are connected to base electrode 43 of transistor 41. Output electrode 47 of the device is connected to electrical ground.

The MOS devices of the bias network 24 function as resistors to provide a bias voltage of $-(V_t+2V_d)$. The voltage at the gate electrode 23 of MOS device 20 is held approximately constant at the bias voltage as a result of the connection of MOS device 46 in the circuit.

The output electrode 47 is connected to ground and its gate is connected to its input electrode 44 so that the input voltage will be approximately $V_t$ (one threshold) for low-current levels through the device.

In order to minimize the current levels, transistor 43 is connected as an emitter follower. The base 41 of the transistor is connected to the threshold voltage of MOS device 46 and the emitter 40 is connected through diode 39 to MOS device 35. As a result, only $1/\beta$of the current through MOS device 35 flows through MOS device 46 and the output electrode 38 of MOS device 35 is held negative at approximately $V_t+2V_d$.

With the bias arrangement shown, a relatively low-voltage signal of approximately 3-volts swing may be used as an interfacing signal. In other words, a relatively low-signal level of only a 3- volt swing is necessary to interface the MOS circuit with other circuits requiring a relatively larger voltage level of, for example, $-V(-15$ volts).

If the input electrode 21 of device 20 is connected to ground, device 20 is turned on and a small current flows through the device. The current is multiplied, or amplified by the gain of transistor 27 ($\beta$) so that output electrode 31 of MOS device 32 is driven towards ground. The output terminal 30 is also driven to an approximate ground level since it is connected to input electrode 31.

If the output electrode 21 of device 20 is connected to an input voltage level greater, more negative, than the excess bias voltage ($-2V_d$), device 20 is turned off. As a result, the output terminal is driven to a usable MOS signal level through MOS device 32.

FIG. 3 shown a further improvement in the FIG. 2 embodiment. When the input voltage turns device 20 off so that the output changes, or switches from approximately ground to a voltage approximately equal to $-V$, the inherent capacitor 15 must be charged through the transistor 27 before the output can be set to $-V$. Since the capacitor 15 is charged at a very slow rate through the base of the transistor, it would be more desirable to provide a faster charge path. MOS device 50 is added to reduce the charge time by providing a charge path from $-V$ to capacitor 15. The gate electrode 51 and the input electrode 52 are connected to the $-V$ voltage source. Output electrode 53 is connected to base 26 of the transistor and to capacitor 15. The device 50 has a relatively large resistance so that the current is reduced to a satisfactory level when the capacitor 15 is not being charged.

Figure 4:
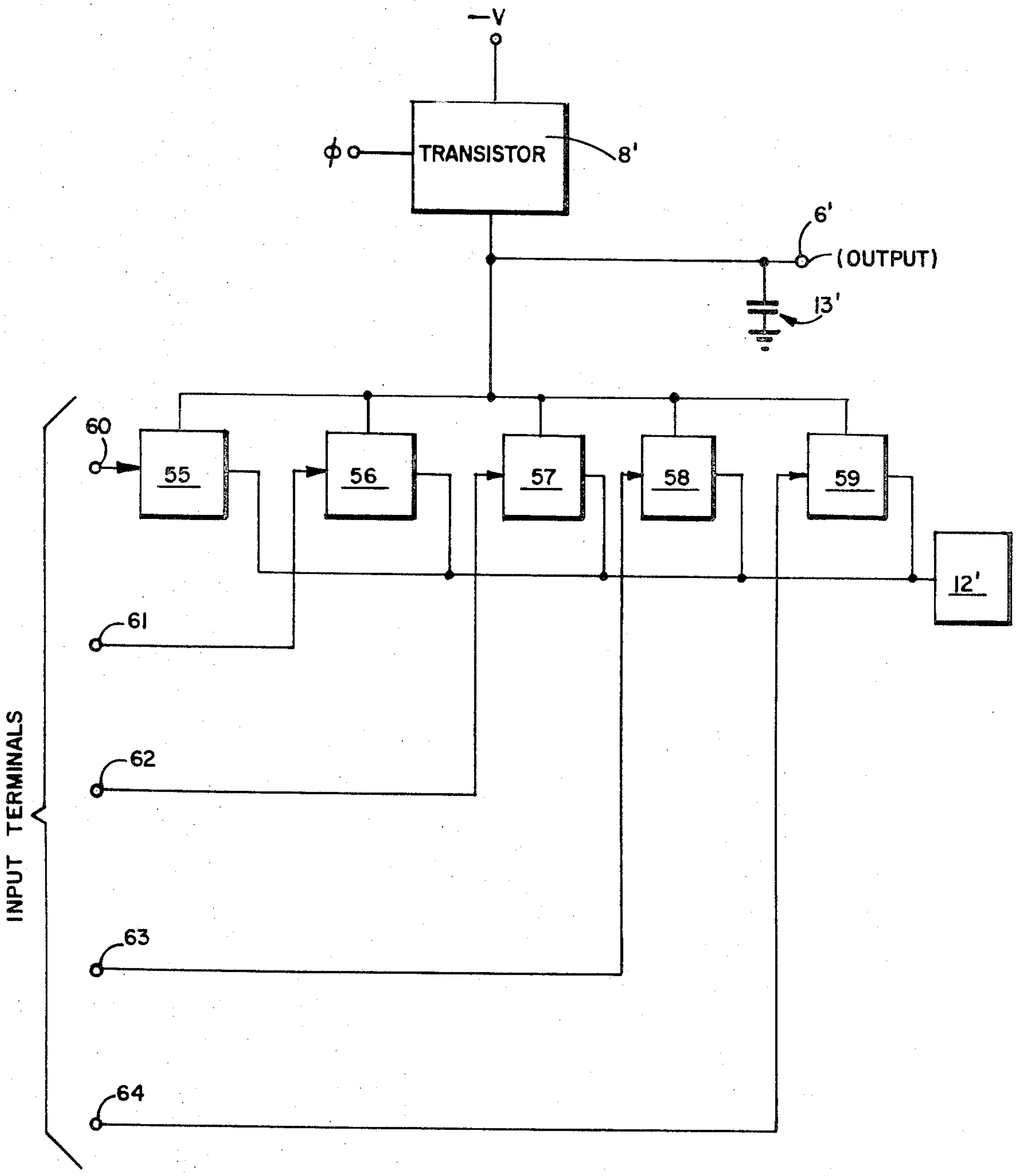
FIG. 4 illustrates a modification of the FIG. 1 embodiment.

FIG. 4 shows a modification in the FIG. 1 system in which MOS devices 55 thru 59 have been substituted for MOS device 2 of FIG. 1 for implementing a noninverting logic function of the AND type. It should be understood, however, that other noninverting logic functions can also be implemented by interconnecting MOS devices in a desired logical configuration. Input terminals 60 thru 64 are connected to sources of signals having relatively low-voltage levels as described in connection with FIG. 1. Biasing source 12' is shown connected to each of the MOS devices for providing a bias voltage which is in excess of the threshold voltage of each of the MOS devices. The excess voltage is no greater than the maximum-voltage swing of the input signals. The output electrode (not shown) of the MOS devices are connected at a common point to MOS device 8' and to output terminal 6'. When any one of the devices is turned, the output terminal is driven to the approximate voltage level of the relatively low input signal. When all of the devices are turned off, the output is driven to approximately $-V$ which is relatively high.

It should be understood that although MOS switching devices have been illustrated and described, other switching devices such as MNS devices, MNOS devices and other enhancement mode field effect devices can also be used.

We claim:

1. An interfacing circuit for converting low-voltage level input signals to relatively high-voltage level output signals comprising:
   - a first field effect transistor connected between input and output terminals and having a first control electrode;
   - means connected to the first control electrode for biasing the first field effect transistor to turn on as a function of the input signal levels, said bias voltage being in excess of one threshold voltage of the first field effect transistor, said excess voltage being no greater than the maximum anticipated input signal levels;
   - voltage source means;
   - a second field effect transistor connected between said voltage source means and said output terminal and having a second control electrode;
   - means connected to said control electrode for turning said second field effect transistor on at least during the time the input signal level on said input terminal has a magnitude less than or equal to said excess bias voltage.

2. The combination recited in claim 1 including amplifier means connected between said first field effect transistor and said output terminal for amplifying the current through said field effect transistor for reducing the effective resistance of said first field effect transistor relative to said second field effect transistor.

3. The combination recited in claim 1 including a third field effect transistor connected between said voltage source means and the inherent capacitance of the output terminal for providing charge current to said inherent capacitance when said second field effect transistor is turned off for decreasing the period required to change the output from one voltage level to a different voltage level.

4. The combination recited in claim 1 wherein said first field effect transistor has a resistance substantially less than the resistance of the second field effect transistor whereby a potential impressed across the first and second field effect transistors is substantially dropped across the second field effect transistor when the first field effect transistor is turned on.

5. The combination recited in claim 1 wherein the means for biasing includes a first field effect transistor resistor connected between said voltage source and said first control electrode, and a second field effect transistor resistor connected between said first control electrode and electrical ground for limiting the voltage on said first control electrode to said bias voltage slightly in excess of the threshold voltage of said first field effect transistor.

6. The combination recited in claim 5 wherein the means for biasing further comprises:

a. amplifier means connected between said second field effect transistor resistor and said first control electrode for amplifying the current from said second field effect transistor resistor for maintaining the voltage at the control electrode at said voltage slightly in excess of said threshold voltage by pulling a relatively low current through said second field effect transistor resistor.

7. The combination recited in claim 6 including diode means connected between said first control electrode and said amplifier means for increasing the bias voltage at said first control electrode by said amount of voltage recited as being in excess of the threshold voltage of said first field effect transistor.

8. The combination recited in claim 1 including a plurality of said first field effect transistor with each of said field effect transistors having an electrode connected to said output terminal, and with each of said field effect transistors having a separate input electrode and a control electrode, and wherein the means for biasing connected to the first control electrode of said first field effect transistor is also connected to the control electrodes of each of said plurality of field effect transistors for biasing the field effect transistors to turn on as a function of the voltage level of input signals on their respective input electrodes.

9. The combination recited in claim 8 wherein said plurality of field effect transistors are connected for implementing a noninverting logic function, with the control electrodes of the plurality of field effect transistors connected to the means for biasing, and said input electrodes receiving relatively low-voltage level input signals.